(12) United States Patent
Weitzel (10) Patent No.: US 8,061,881 B2
(45) Date of Patent: *Nov. 22, 2011

(54) VEHICLE RUNNING LIGHT SYSTEM

(76) Inventor: David M. Weitzel, Cincinnati, OH (US)

( * ) Notice: Subject to any disclaimer, the term of this patent is extended or adjusted under 35 U.S.C. 154(b) by 40 days.

This patent is subject to a terminal disclaimer.

(21) Appl. No.: 12/186,341

(22) Filed: Aug. 5, 2008

(65) Prior Publication Data

US 2009/0190366 A1 Jul. 30, 2009

Related U.S. Application Data

(63) Continuation of application No. 11/089,596, filed on Mar. 25, 2005, now Pat. No. 7,425,088.

(51) Int. Cl.
*B60Q 1/26* (2006.01)
(52) U.S. Cl. ......................................... 362/540; 362/276
(58) Field of Classification Search .................. 362/540, 362/542–543, 276
See application file for complete search history.

(56) References Cited

U.S. PATENT DOCUMENTS

| | | | |
|---|---|---|---|
| 3,740,715 A * | 6/1973 | Szekessy | 340/467 |
| 4,903,174 A | 2/1990 | Busby | |
| 5,150,098 A * | 9/1992 | Rakow | 340/479 |
| 5,497,306 A | 3/1996 | Pastrick | |
| 5,521,466 A | 5/1996 | Vincent | |
| 5,666,103 A | 9/1997 | Davis, Jr. | |
| 5,909,084 A | 6/1999 | Fu et al. | |
| 5,966,073 A | 10/1999 | Walton | |
| 6,150,933 A * | 11/2000 | Matsumoto | 340/479 |
| 6,382,819 B1 | 5/2002 | McQuiston | |
| 6,864,786 B2 * | 3/2005 | Speckhart et al. | 340/467 |
| 6,876,300 B2 * | 4/2005 | Ponziani | 340/476 |
| 6,897,771 B1 | 5/2005 | Lodhie et al. | |
| 6,908,220 B2 * | 6/2005 | Misawa et al. | 362/541 |
| 6,997,591 B2 | 2/2006 | Krumholz | |
| 2004/0090767 A1 | 5/2004 | Hou | |
| 2005/0111231 A1 * | 5/2005 | Crodian et al. | 362/545 |

* cited by examiner

*Primary Examiner* — Julie Shallenberger
(74) *Attorney, Agent, or Firm* — Douglas A. Scholer (57) ABSTRACT

A running light is activated in response to a number of command signals that correspond to the activation of one or more vehicle lights. For example, the running light may blink when an associated turn signal blinks, may dimly illuminate when a parking light is on, and may shine brightly when a brake light is on.

17 Claims, 6 Drawing Sheets

VEHICLE RUNNING LIGHT SYSTEM

CROSS-REFERENCE TO RELATED APPLICATION

This application is a continuation to U.S. patent application Ser. No. 11/089,596, entitled "Vehicle Running Light System" filed on Mar. 25, 2005 now U.S. Pat. No. 7,425,088, which is incorporated herein.

FIELD OF THE INVENTION

The present invention generally relates to electrical systems on vehicles, and more particularly, to a system and method for coordinating and otherwise operating vehicle lights.

BACKGROUND OF THE INVENTION

Automobiles, trailers and other vehicles increasingly employ running lights on their exteriors to increase road awareness and their inherent aesthetic value. Running lights are conventionally connected in circuit with a switch on the interior of the vehicle that is under the control of the driver. Running lights, also called clearance or marker lights on all types of vehicles and trailers, are conventionally illuminated whenever a driver activates the headlight switch to illuminate the parking lights and/or the headlights.

More particularly, running lights are lights located on the exterior sides of a vehicle that, in addition to parking lights conventionally located at the corners of the vehicle, illuminate when a headlight switch is activated, wherein that activation of the headlight switch includes a setting where the parking/running lights are on, but the headlights remain off. Parking and running lights may additionally illuminate when the headlight switch is in a second position corresponding to the headlights being on, as well. Thus a running light may include a light located along an exterior side of a vehicle that is configured to be activated at the same time as is a conventional parking light.

The use of running lights on towed vehicles has also increased, largely in step with the rising popularity of boating, camping and other outdoor recreational activities. Most such vehicles include on-board electrical systems for providing, for instance, brake lights and turning signals. These complete on-board electrical systems are controlled by the electrical system of the towing vehicle. For instance, the brake lights of a towed vehicle will activate in sequence with the brake lights of the towing vehicle.

A hard-wired electrical connection is used generally to interface respective electrical systems and to coordinate the lights of separate vehicles. Each of the wiring harnesses have a harness connector with female and/or male terminals in a pin and/or blade configuration in order to establish an electrical connection between the wiring harnesses. The wiring harness of the towed vehicle usually includes an array of male pin terminals for insertion into an array of female pin terminals associated with the wiring harness of the towing vehicle.

With the increased availability and deployment of running lights on vehicles, there exists a continuing need to more efficiently and effectively utilize these and other running lights.

SUMMARY OF THE INVENTION

The This invention provides an improved method and system for operating a vehicle running light. The running lights may generally be activated in response to command signals that correspond to the activation of one or more other vehicular lights. For example, the running light may blink when an associated turn signal blinks, may illuminate when an interior courtesy or dome light is illuminated, and may shine dimly when the brake light on a tow vehicle is not activated, and then brightly when a brake light on a vehicle activates.

In one respect, each running light is responsive to any one of a number of operating modes. Such operating modes, or lighting schemes, include parking, turn signal, courtesy, and hazard lighting operations. As such, the modes are associated with the activation of an applicable vehicle light. An indication of the modes and/or activation of the vehicle lights is communicated to the running light via input signals received by a controller. The controller may use a lookup table or otherwise process an input signal, which may be concurrently used to activate another vehicle light, to determine and output an appropriate control signal. The control signal, in turn, is configured to initiate activation of a running light.

As such, an embodiment of this invention includes a controller that allows the rear and running lights of a trailer and/or powered vehicle to function optionally as either brake, turn, courtesy, emergency flasher or parking lights. For instance, a running light source on a towed or self-powered vehicle may illuminate in at least two modes that correspond to the lighting of a parking/brake light, a headlight, a dome light or a turn signal light. A controller in communication with the running light uses a lookup table to convert control signals initiated by the driver of the vehicle into signals used by the running lights, among others.

In a towing scenario, such signals may be communicated via a harness leading to the controller. While a four-pin harness may have application in certain embodiments of this invention, one skilled in the art will appreciate that other harnesses having two or more connectors may be accommodated by the principles of this invention. In another embodiment, where there is no trailer, the running lights of a truck are activated according to analogous turn, courtesy, emergency flasher or parking light functions of the truck.

The lights typically comprise light emitting diodes (LED's). The brightness of such LED's may be selectively controlled through pulse width modulation. By varying the duty cycle of the power provided to the LED, different dimming and brightness features may be used to create a desired affect as specified by the control signal. For instance, a single LED may be made to illuminate dimly when activated using a low frequency, and may be made to illuminate brightly when activated with a high frequency. Other embodiments may use resistors in connection with LED's to create a comparable affect, as well as single and multiple filament incandescent bulbs, where preferred. Where desired, LED's may be contained within a protective tube or sheath.

As discussed herein, some applications may result in running lights flashing when operating in a hazard mode of operation, e.g., four way emergency light flashing. Running lights may additionally flash to indicate a change of lanes or direction when operating in turn mode, e.g., when a conventional turn signal is activated. Running lights may be dimmed and/or brightened in accordance with the illumination of a courtesy light and/or brake light. Such features ultimately increase visibility and road awareness. Optimized use of LED's translates into greater reliability, greater safety, and other cost savings.

Various additional advantages, objects and features of the invention will become more readily apparent to those of ordinary skill in the art upon consideration of the following detailed description of embodiments taken in conjunction with the accompanying drawings.

BRIEF DESCRIPTION OF THE DRAWINGS

FIG. The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
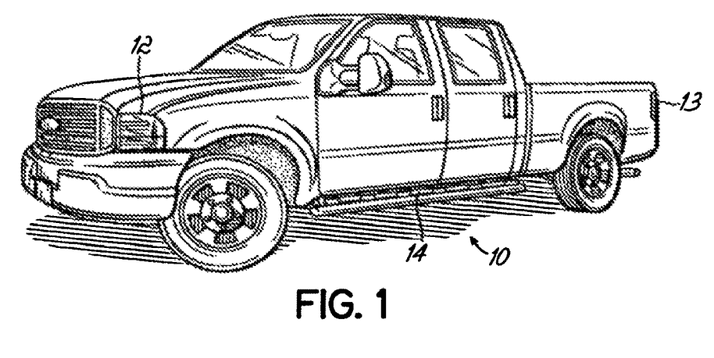
FIG. 1 shows a vehicle having running lights that are responsive to the activation of at least two other vehicle lights.

FIG. 1 shows a vehicle 10 having running lights 14 that are responsive to activation of at least two other vehicle lights. More specifically, the running lights 14 may illuminate in response to two or more types of command signals received by a controller in communication with the running lights. Each command signal corresponds to one or more modes of operation of the car lighting system, e.g., turn signal, hazard, courtesy, brake and parking lights. The command signals that initiate activation of the running lights 14 may include or may be substantially concurrent with signals that activate other respective lights of the vehicle 10, such as a headlight, brake/parking (tail light), courtesy, and/or turn signal lights.

The vehicle 10 shown in FIG. 1 includes, among other lights, i.e., headlight 12 and taillight 13, and a bank of running lights 14. While suitable running lights of one embodiment may be incandescent bulbs, the running lights 14 shown in FIG. 1 include light emitting diodes (LED's). As discussed herein, the signal supplied to an LED running light 14 may be pulse width modulated to create multiple lighting effects. For instance, a signal having a smaller bandwidth may be applied to an LED to generate a relatively dim illumination, while a larger bandwidth is applied to the same LED to generate a relatively brighter illumination. As such, the LED may be dimmed for a parking indication, and caused to be at its brightest for a brake indication. Other effects may include blinking, as simulated by turning the LED on and off according to vehicle wiring signals. An LED may be "off" for purposes of this specification when the LED is made to blink with such a frequency that it appears to be off to the human eye.

By varying the duty cycles of power delivered to the LED in this manner, an analog-analogous brightness range of light levels may be achieved. Such a range may be used to generate, for instance, a relatively dim illumination for select running lights and/or taillights when operating in a parking light mode. Such a mode may coincide with the activation of a dome light inside the vehicle. The dome light may activate in response to a vehicle door opening or the vehicle being unlocked by a remote transmitter, for instance. The controller of the system may vary the duty cycle to generate a relatively brighter illumination in the same LED when operating in turn signal mode.

This feature thus allows a single running light comprising, for instance, a LED or single filament incandescent light bulb, to accomplish at least two different functions in accordance with two different operating modes, and/or in sequence with the activation of two or more other lights. For instance, the running light, or a bank of running lights, may be configured to illuminate differently to accommodate at least two different operating modes. For instance, while operating in turn signal mode, the command signal supplied to the LED from the controller may further be periodically interrupted to accomplish a blinking, (repetitious on/off), effect conventionally associated with a turn signal operating mode. The same LED may illuminate continuously, either at a bright or dim lighting level, during reverse mode operation. Using pulse width modulation, this feature may be accomplished with minimal of additional hardware.

An embodiment may accomplish a comparable brightness range in an LED by using resistors to selectively lower the current supplied to the LED. The lower current level supplied to the LED translates into dimmer illumination. While this technique may be useful in certain applications of the invention, the pulse width modulation technique discussed above may be alternatively employed where the operator/manufacturer prefers to supply a constant and otherwise optimized voltage level to the LED to promote long life. For instance, the pulse width modulation technique may supply twelve volts to the LED, while the resistor assisted embodiment may vary the supplied voltage from less than one volt to about twelve volts in one application.

As discussed above, still another embodiment may utilize a single filament incandescent bulb running light. For instance, a dual filament incandescent bulb may illuminate in response to either of at least two command signals that correspond to different lighting functions/modes. For example, one filament of a dual filament incandescent bulb in a typical brake/parking light that burns more dimly than the other filament of the typical brake/parking light may be used in a parking light mode function analogous to that discussed above in the context of an LED application. In still another embodiment, a running light includes a variety of incandescent bulbs collocated within the light fixture.

One skilled in the art will appreciate that while the running lights 14 are positioned along the side of vehicle 10 as shown in FIG. 1, any other number of running light configurations may alternatively be used. For instance, suitable running lights may alternatively and/or additionally be positioned on the front, rear and/or the undercarriage of the vehicle. Moreover, while the vehicle 10 shown in FIG. 1 is a motorized vehicle capable of towing another, one skilled in the art will appreciate that analogous running light configurations may be implemented on a towed vehicle, as well.

Figure 2:
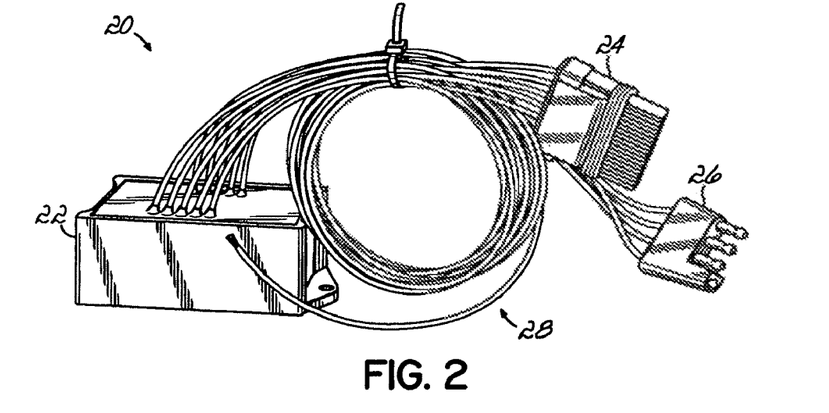
FIG. 2 shows a harness assembly configured to translate and otherwise communicate signals between a towing vehicle and a towed vehicle for activating running and/or taillights.

FIG. 2 shows a harness assembly 20 configured to translate and otherwise communicate signals between a towing vehicle and a towed vehicle. The harness assembly 20 includes a controller 22 having respective plugs, or connectors 24 and 26. The connectors 24 and 26 are configured to respectively plug into mating connectors of the towing vehicle and towed vehicle. The connectors 24 and 26 shown in FIG. 2 are four pin, flat trailer plugs. However, one of skill in the art will appreciate that other embodiments may include more or less pins. Respective wiring configurations 28 between the respective connectors 24 and 26 convey signals between the vehicles and the controller 22. The controller 22 shown in FIG. 2 includes a processor, such as a microchip, which is sealed inside a corrosion resistant housing.

Figure 3:
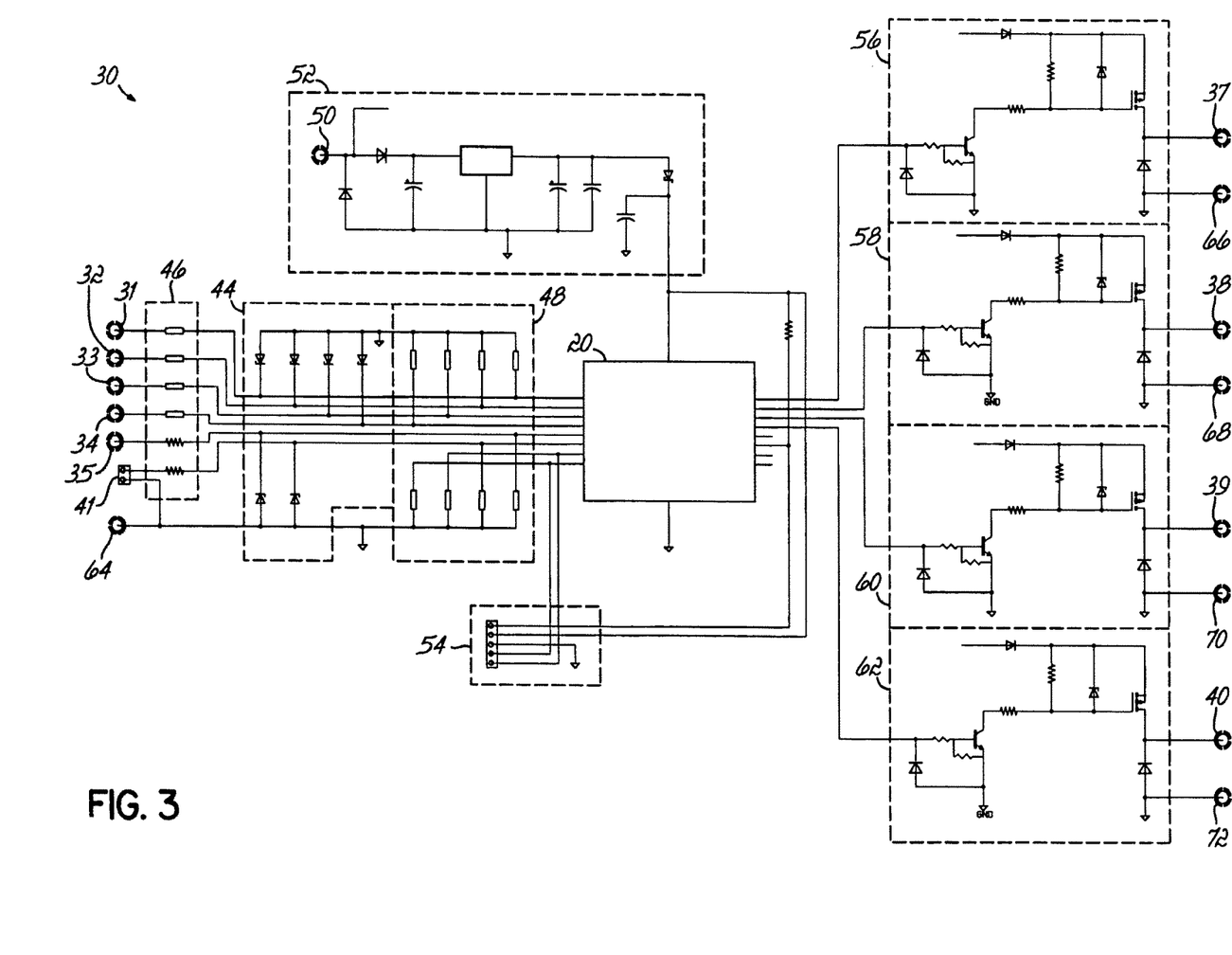
FIG. 3 shows a schematic diagram of the electrical circuitry including a controller, connectors and associated wiring of the harness assembly of FIG. 2.

FIG. 3 shows a schematic diagram representative of the electrical circuitry 30 for the controller 22 and circuit connection comprising the connectors 24, 26 and wiring 28 of the harness assembly 20 of FIG. 2. As shown in the schematic diagram, the controller 22 shown in FIG. 3 includes an eight-bit integrated circuit microchip. Such a controller 22 has sixteen ports as is known in the art. The controller 22 may use a look-up table to associate signals generated in response to activation of input signals 31-35 to output signals configured to activate LED's connected to output channels 37-40, e.g., the running lights.

In one embodiment, each LED may require only two wire connections comprising part of the circuit connection, i.e., one ground and one positive lead. This feature represents a robust simplification over other lighting systems that could require at least two positive leads in addition to a ground, presenting an additional potential failure point. Use of a controller to intelligently generate and route command signals allows different command signals to travel over a common wire connection, reducing the need for additional wiring. As such, embodiments of the present invention may work with conventional wire connections to achieve lighting displays that are consistent with the presenting invention. The controller feature additionally facilitates the "on" and "off" lighting effects as discussed herein.

While the controller shown in FIG. 2 is included within a harness assembly 20 that is external to the vehicle, a controller of another embodiment may be hardwired inside the vehicle. It should further be appreciated by one of skill in the art that while only one controller 22 is shown schematically in FIG. 3, a controller for purposes of this invention may include a plurality and/or a network of processors. As such, one skilled in the art will appreciate that a suitable controller 22 may include any device having processing and memory sufficient to activate the running light in response to receiving a signal indicative of the illumination status of another light.

Such lights may include LED's connected to output channels 37-40 configured for use on, for instance, an automotive and/or towed vehicle. The controller 22 receives input signals on input channels 31-35. Input signals are generated from lights and as such may be activated by a driver in a motorized vehicle. Activated lights may be activated by opening a door, activating a turn signal switch, a headlight switch, or a brake pedal. Input channels 31-35, for instance, may include brake/parking and running lights of the same or another vehicle. That is, LED's connected to output channels 37-40 may be on a towed vehicle, or in another embodiment, may be the taillights and running lights of the same vehicle. Such is the case in the truck 10 shown in FIG. 1. A jumper 41 shown in the schematic 30 of FIG. 3 allows selective wiring to a brake light and sidelights/running lights of the same or another vehicle.

Zener diodes in block 44 and resistors in block 46 function to step-down the voltage from about twelve volts to about five volts. The resistors in block. 48 ensure the input signals are low unless activated by an input signal greater than two volts. Input signals are monitored on input channels 31-35. As discussed herein, the controller 22 may operate optimally at about the five volt power level. Power from the battery or another source 50 is provided to the controller 22 via circuitry shown in block 52 of FIG. 3. This associated circuitry in block 52 also functions to keep voltage to the optimal level for the processor in the controller 22.

A jumper circuit 54 shown in FIG. 3 provides an input port to change programming associated with the controller 22 on the fly. For example, a programmer may plug in a mating connection into a programming source (not shown) configured to download a program and/or operating parameter/setting into the controller 22.

Voltage adjustment circuitry 56, 58, 60 and 62 associated with output channels 37-40 include resisters, FET's and other transistors configured to step-up the voltage from the controller 22 to the respective vehicle lights. This feature accommodates desired operating parameters of the LED running lights connected to output channels 37-40, which operate optimally at around twelve volts. Ground ports 64, 66, 68, 70 and 72 are provided as is known in the art.

Figure 4:
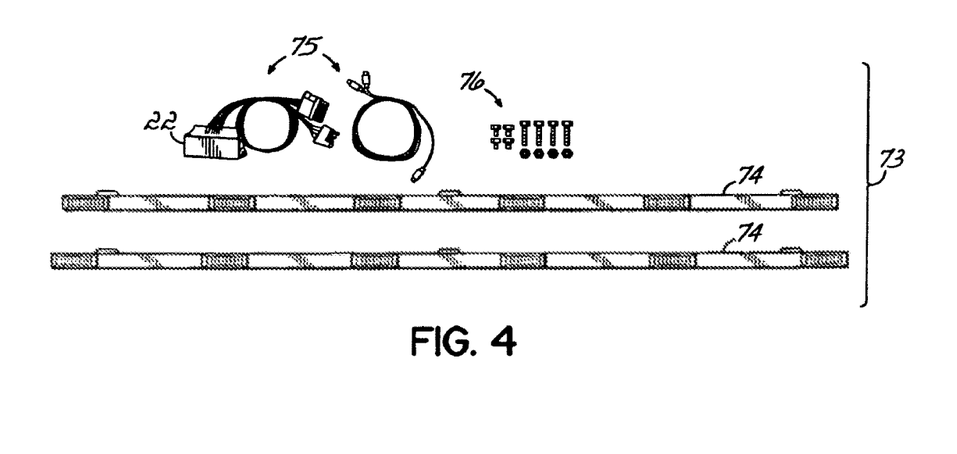
FIG. 4 shows an assembly used to modify existing vehicles in accordance with the principles of the present invention.
Figure 5A:
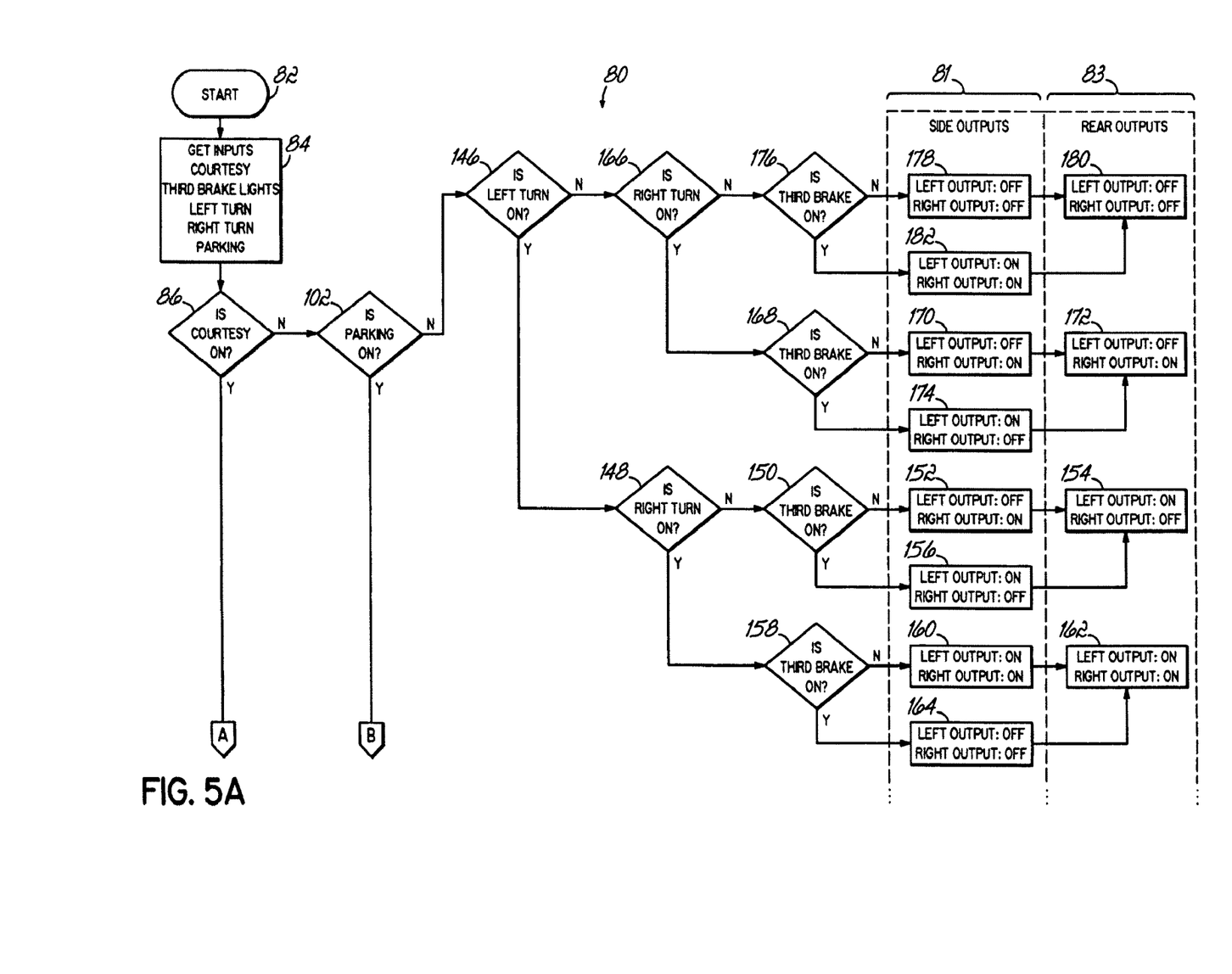
FIG. 5A shows a first portion of a flowchart having an exemplary sequence of steps executable by the controller of FIG. 3 in response to the activation of various vehicle lights.
Figure 5B:
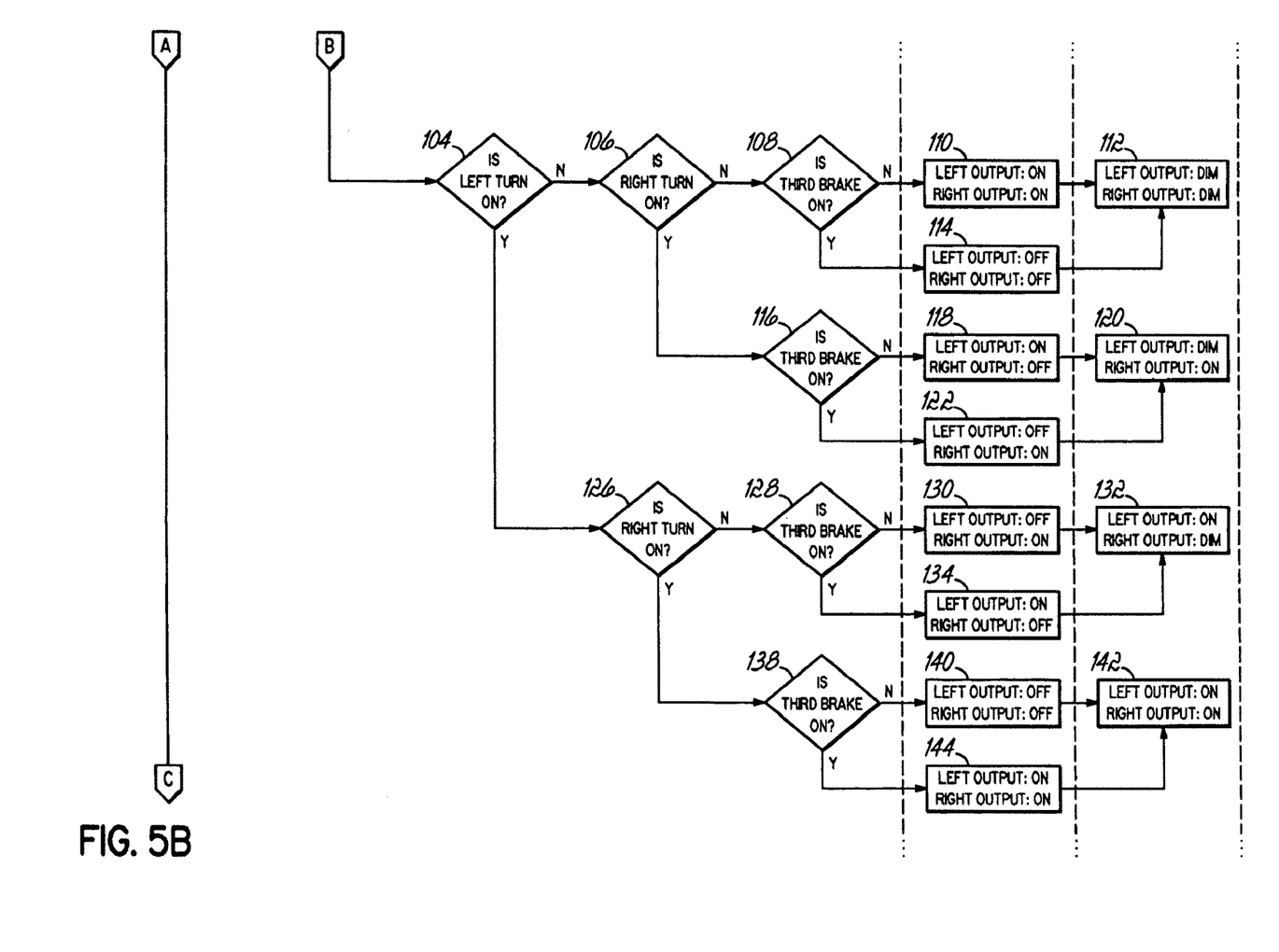
FIG. 5B shows a second portion of the flowchart begun in FIG. 5A.
Figure 5C:
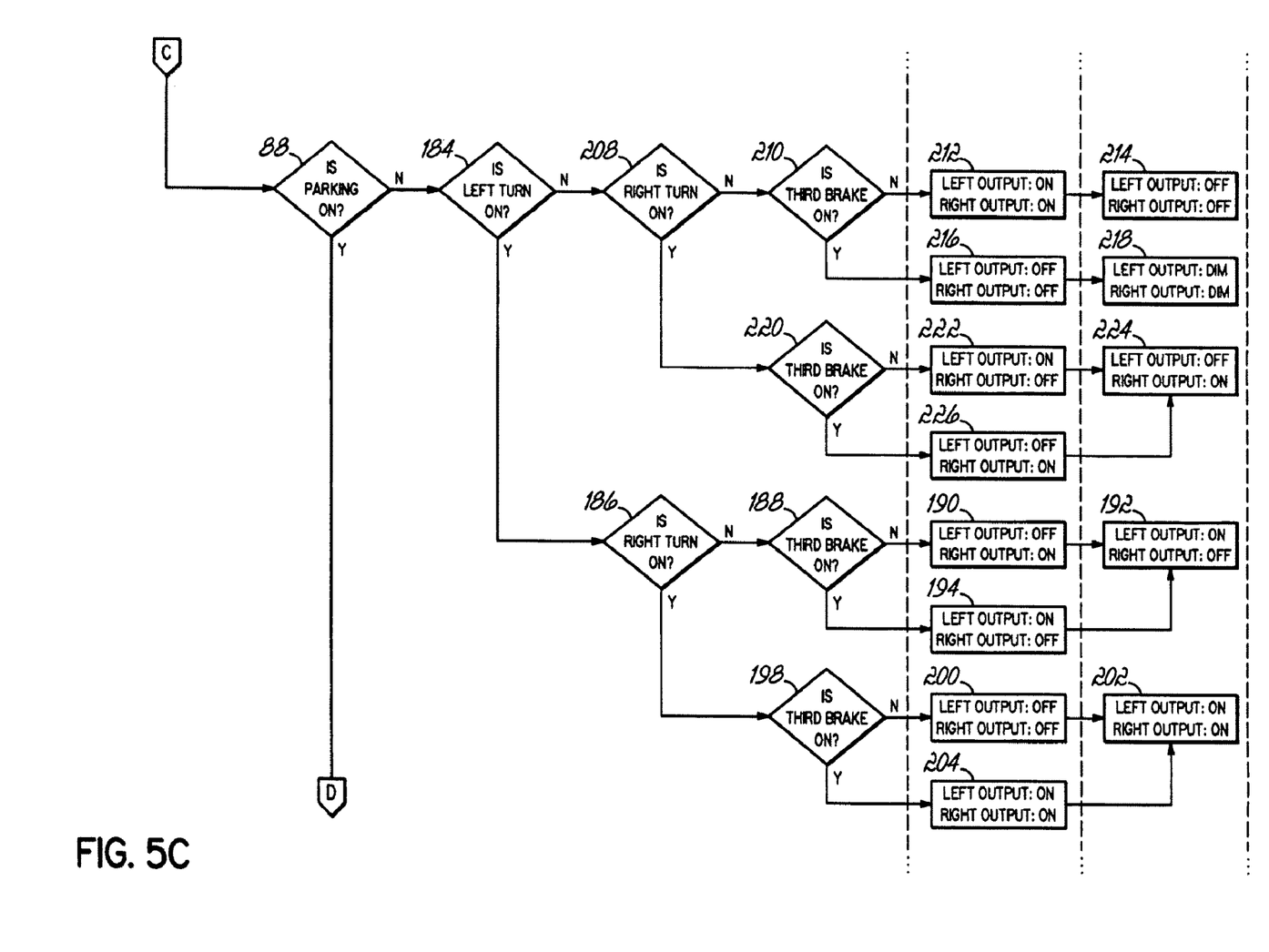
FIG. 5C shows a third portion of the flowchart begun in FIG. 5A.
Figure 5D:
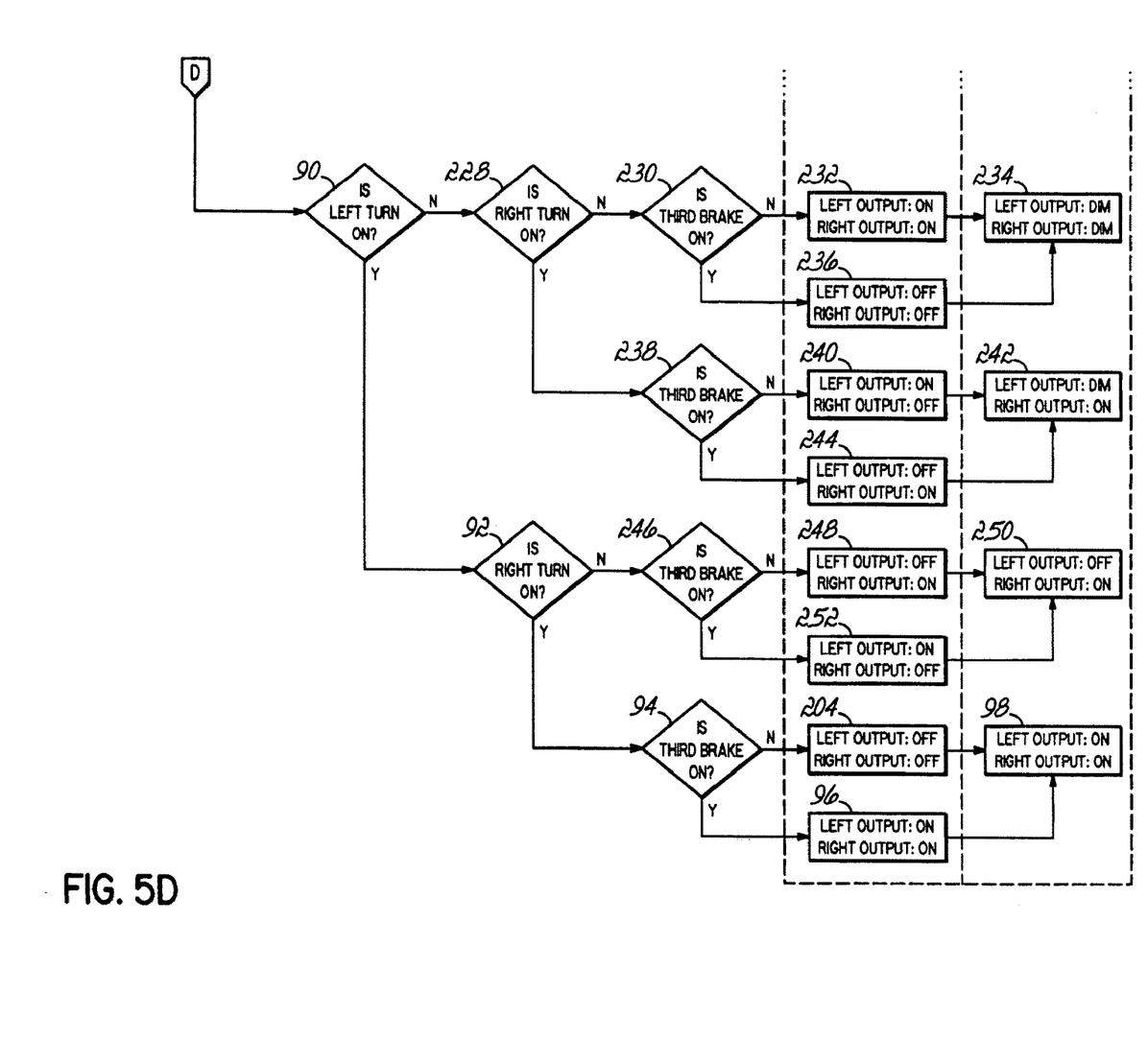
FIG. 5D shows a fourth portion of the flowchart begun in FIG. 5A.

FIG. 4 shows a system 73 that may be used to modify existing vehicles in accordance with the principles of the present invention. For instance, the system 73 could be installed as an aftermarket product for a truck, SUV, camper, boat trailer, or as OEM equipment on any motorized or towed vehicle. The system 73 includes racks of running lights 74, in addition to a controller, circuit connection components 75 and fasteners 76.

The flowchart 80 shown in FIGS. 5A-D show an exemplary sequence of steps executed by the controller 22 of FIG. 3 in response to input signals activating input channels 31-35 by the driver. The controller 22 may use a look-up table to associate signals generated in response to activation of input signals on input channels 31-35 to output signals configured to activate LED's connected to output channels 37-40, e.g., the running lights. For instance, a look-up table or other memory may associate input parameters of the input signal to control parameters used to generate the control signal. As such, an input parameter comprises data conveyed in the input signal that is used to associate or otherwise determine the control signal. The control parameter comprises part of or is used to generate the control signal.

The flowchart 80 includes a sequence of conditions, or operating lighting states/modes, which are listed in the diamond shaped decision blocks. A combination of these modes as mapped in the flowchart 80 ultimately leads to an output, or command signal configured to initiate activation in column 81 of a sidelight of, for instance, a towed vehicle such as a trailer or camper, and a rear running light of a vehicle, i.e., in column 83. Such a rear light may comprise an LED running light positioned below the tailgate of a vehicle, brake light, or turn signal for instance.

Turning more particularly to the processes of the flowchart 80, an exemplary sequence may begin at block 82, proceeding when a limousine driver activates a light from inside their cab. Such a light may include a courtesy/dome light, a right/left turn light and/or a parking or brake light. The driver may initiate activation of these lights in any manner known in the art.

The controller 22 receives input signals indicating the activation of one or more of the lights at block 84. Such signals are received from the towing vehicle and correspond to a lighting mode of operation. The controller 22 uses these signals to determine one or more output/command signals. As will be evident to one skilled in the art, a number of exemplary lighting scenarios are outlined in the flowchart 80.

As discussed herein, some such scenarios may result in running lights flashing on and off when operating in a hazard mode of operation, e.g., when conventional hazard lights are activated. Running lights may additionally flash to indicate a change of lanes or direction when operating in turn mode, e.g., when a conventional turn signal is activated. Running lights may be dimmed and/or brightened in accordance with the illumination of a parking light and/or brake light.

In one such scenario shown in FIGS. 5A-D, the controller 22 determines at block 86 whether the courtesy light is on. If the courtesy light is on at block 86, the controller 22 may further determine at block 88 whether the parking light is on. If the parking light is on at block 88, then the controller 22 may then determine whether a left turn signal light is on at block 90. If so, then the controller 22 may determine at block 92 whether the right turn signal light is on. Where the right turn signal light is active, then the controller 22 may determine at block 94 whether a brake light is on. Such a brake light may include a high mounted brake light, where applicable. If the brake light is determined to be active as shown in FIGS. 5A-D, the controller 22 turns on the left and the right side running lights at block 96. The controller 22 additionally activates the rear lights at block 98.

At block 102, the controller may determine if the parking light is on. If so, the controller 22 may determine if the left turn signal is on at block 104. If the left turn signal is off at block 104, then the controller 22 may determine if the right turn signal is on at block 106. If not, the controller 22 may determine if a third brake light is on at block 108. A third brake light may comprise a light positioned on the car above the set of brake lights conventionally positioned near the tailgate of a vehicle. For instance, a third brake light may be positioned above or at the same level as a rear windshield. If the third brake light is determined to be on at block 108, then the left and right side outputs will be off at block 114. The left and right outputs for the rear running lights will be dim at block 112. If the third brake light at block 108 is alternatively off, then the side running lights will both be on and the rear running lights will operate as before at block 112.

If the right turn signal is alternatively on at block 106, then the controller 22 will determine at block 116 if the third brake light is on. If not, then the left side running light will be on at block 118 and the right side running light will be off at block 118. The left rear running light will be dim at block 120 and the right rear running light will be on, i.e., brightly, at block 120. If the third brake light is alternatively on at block 116, then the left side running light will be off at block 118, and the right side running light will be on. The rear running lights will operate as described above in relation to block 120.

If the left turn signal is alternatively on at block 104, then the controller 22 will determine if the right turn signal is on at block 126. If not, then the controller 22 will determine if the third brake light is on at block 128. If the third brake is not on, then the left side running light will be off at block 130, and the right side running light will be on. The left rear running light will be on brightly at block 132, and the right rear running light will be dim at block 132. If the third brake light is alternatively on at block 128, then the left side running light will be on at block 134, and the right side running light will be off.

If the right turn signal at block 126 is alternatively on, then the controller 22 will determine if the third brake signal is on at block 138. If not, then both side running lights may be off at block 140 and both rear running lights may be on brightly at block 142. If the third brake light is alternatively on at block 138, then both side running lights may be on at block 144, and both rear running lights may be on brightly at block 142. While the rear running lights are discussed herein in terms of left and right, or both, one skilled in the art will recognize that the left and right outputs for purposes of this specification may correspond to individual lights or respective sets of running lights on the left and right sides of the vehicle.

In similar fashion, the controller 22 will determine if the left turn signal is on at block 146, if the right turn signal is on at block 166, and/or if the third brake light is on at block 176. Based upon those determinations, the controller 22 may determine respectively at blocks 208 and 228 if the right turn signal light is on. Depending upon that determination, the controller 22 may respectively determine if the third brake light is on at blocks 150, 158, 210, 220, 230, 238 and 246. That determination may prompt the controller 22 to respectively send output signals to the side running lights at blocks 170, 174, 178, 182, 212, 216, 222, 226, 232, 236, 240, 244, 248, 252 and 254. Other control signals will respectively be sent to the rear facing running lights at blocks 154, 162, 172, 180, 192, 202, 214, 218, 224, 234, 242 and 250.

The processes of FIGS. 5A-D may continuously repeat as initiated by input signals. Moreover, while the flowchart 80 includes multiple exemplary lighting combinations, one skilled in the art will appreciate that any number of additional lighting scenarios may additionally and/or alternatively be included.

While this invention has been illustrated by a description of various embodiments and while these embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. A method of illuminating a single light source of a vehicle in one of a plurality of operating modes, wherein the vehicle generates a plurality of input signals in response to a plurality of operating conditions, the method of illuminating the single light source comprising:

generating a first input signal of the plurality of input signals in response to a first vehicle operating condition of the plurality of operating conditions, wherein the first vehicle operating condition is initiated by an operator of the vehicle, wherein the first vehicle operating condition includes one of a group consisting of: a parking light lighting operation, a turn signal lighting operation, a courtesy light lighting operation, a brake light lighting operation, and a hazard lighting operation;

generating a second input signal of the plurality of input signals in response to a second vehicle operating condition of the plurality of operating conditions, wherein the second vehicle operating condition is initiated by the operator of the vehicle, wherein the second vehicle operating condition is different than the first vehicle operating condition and is selected from the group consisting of: a parking light lighting operation, a turn signal lighting operation, a courtesy light lighting operation, a brake light lighting operation, and a hazard lighting operation;

receiving the first input signal at a first controller port and the second input signal at a second controller port;

storing the first and second vehicle operating conditions at a lookup table in association with an output of a plurality of outputs, wherein each output of the plurality of outputs corresponds to one of a plurality of operating modes that include at least one of: an on state, an off state, a dimming state, a brightening state, and a flashing state;

determining the output based on both of the first vehicle operating condition and the second vehicle operating condition; and generating a control signal according to the output to illuminate the single light source in accordance with one of the plurality of operating modes.

2. The method of claim 1, further comprising operating concurrently with the single light source and in the one of the plurality of operating modes at least one of: a turn signal vehicle light, a parking vehicle light, a brake vehicle light, a courtesy light, a tail light, a running light, and a side turn signal vehicle light.

3. The method of claim 1, manufacturing the single light source to be at least one of: a light on a front side of the vehicle, a light on a rear side of the vehicle, a side mirror light, a marker light, a trailer light, a high-mounted light, a rearview mirror light, and a side signal vehicle light.

4. The method of claim 1, further comprising modifying a frequency at which the single light source illuminates according to a brake actuation.

5. The method of claim 1, further comprising increasing a frequency at which the single light source illuminates proportionally to a brake actuation.

6. The method of claim 1, further comprising modifying a frequency at which the single light source illuminates according to a force applied to a brake pedal.

7. The method of claim 1, further comprising modifying a brightness at which the single light source illuminates according to a force applied to a brake pedal.

8. The method of claim 1, further comprising increasing a brightness at which the single light source illuminates proportionally to a force applied to a brake pedal.

9. The method of claim 1, wherein the vehicle includes at least one of a towed vehicle, a tractor trailer and a motorcycle.

10. The method of claim 1, wherein the single light source includes a light emitting diode.

11. The method of claim 1, further comprising activating the single light source using pulse width modulation.

12. The method of claim 1, further comprising illuminating the single light source to repeatedly blink on and off.

13. The method of claim 1, further comprising modifying an existing vehicle lighting system.

14. The method of claim 1, further comprising associating the first vehicle operating condition with an activation of at least one of: a vehicle light, a switch, and a sensor activated by a vehicle operator.

15. The method of claim 1, further comprising manufacturing the single light source as part of an original equipment manufacturing process.

16. The method of claim 1, further comprising illuminating the single light source differently for each of at least two operating modes of the plurality of operating modes.

17. The method of claim 1, further comprising connecting a circuit connection consisting of two wires to the single light source to communicate the control signal to the single light source.

* * * * *